US011918522B2

(12) United States Patent
Pujol Oller et al.

(10) Patent No.: US 11,918,522 B2
(45) Date of Patent: Mar. 5, 2024

(54) RETRACTABLE RAMP ASSEMBLY FOR ALLOWING PEOPLE TO ENTER VEHICLES

(71) Applicant: MASATS, S.A., Sant Salvador de Guardiola (ES)

(72) Inventors: Jordi Pujol Oller, Sant Salvador de Guardiola (ES); Jose Bernabeu Viceo, Sant Salvador de Guardiola (ES)

(73) Assignee: MASATS, S.A., Sant Salvador de Guardiola (ES)

( * ) Notice: Subject to any disclaimer, the term of this patent is extended or adjusted under 35 U.S.C. 154(b) by 772 days.

(21) Appl. No.: 16/982,221

(22) PCT Filed: Mar. 20, 2019

(86) PCT No.: PCT/ES2019/070187

§ 371 (c)(1),
(2) Date: Sep. 18, 2020

(87) PCT Pub. No.: WO2019/180294

PCT Pub. Date: Sep. 26, 2019

(65) Prior Publication Data

US 2021/0361499 A1 Nov. 25, 2021

(30) Foreign Application Priority Data

Mar. 21, 2018 (EP) .................................... 18382192

(51) Int. Cl.
*A61G 3/06* (2006.01)

(52) U.S. Cl.
CPC .............. *A61G 3/067* (2016.11); *A61G 3/061* (2013.01)

(58) Field of Classification Search
CPC ........ A61G 3/061; A61G 3/062; A61G 3/066; A61G 3/065; A61G 3/067; B60P 1/431; B60P 1/43; B60R 3/02; E04F 2011/0055
See application file for complete search history.

(56) References Cited

U.S. PATENT DOCUMENTS 5,636,399 A * 6/1997 Tremblay .................. B60R 3/02 14/71.1
5,832,555 A * 11/1998 Saucier .................. B60P 1/431 14/71.1

(Continued)

FOREIGN PATENT DOCUMENTS

EP 1 166 739 A2 1/2002
EP 2 260 817 A2 12/2010

(Continued)

OTHER PUBLICATIONS

International Search Report for PCT/ES2019/070187 dated Jul. 4, 2019 [PCT/ISA/210].

(Continued)

*Primary Examiner* — Emma K Frick
(74) *Attorney, Agent, or Firm* — Sughrue Mion, PLLC

(57) ABSTRACT

The ramp assembly is integrated and flush in an area of the floor of the vehicle adjacent to a door and is capable of adopting two end positions, a resting position, wherein a platform is hidden inside the vehicle, and an operative ramp position, wherein the platform is arranged on an inclined plane from the floor of the vehicle to a surface located at a lower height level from which people gain access. The ramp assembly is provided with a lifting mechanism in order to minimise the height difference between the floor and the rear side of the platform in the operative ramp position and comprises at least one rocker piece arranged articulately between movement transmission means and the platform, and at least one wedge that is in contact with a lower bearing.

14 Claims, 7 Drawing Sheets

(56) References Cited

U.S. PATENT DOCUMENTS

| | | | | |
|---|---|---|---|---|
| 6,186,733 | B1 * | 2/2001 | Lewis | B60P 1/431 414/921 |
| 6,343,908 | B1 * | 2/2002 | Oudsten | A61G 3/061 414/921 |
| 6,470,523 | B1 * | 10/2002 | Sardonico | A61G 3/061 14/71.1 |
| 6,598,253 | B1 * | 7/2003 | Allen | A61G 3/067 14/71.1 |
| 9,050,229 | B1 * | 6/2015 | Morris | A61G 3/067 |
| 11,299,098 | B2 * | 4/2022 | Sato | B60R 3/02 |
| 11,413,198 | B2 * | 8/2022 | Smith | B60P 1/431 |
| 11,548,428 | B2 * | 1/2023 | Smith | A61G 3/067 |
| 11,634,080 | B2 * | 4/2023 | Brion | B61D 23/025 280/166 |
| 2006/0245883 | A1 * | 11/2006 | Fontaine | A61G 3/067 414/537 |
| 2015/0052693 | A1 * | 2/2015 | Allen | A61G 3/061 14/71.1 |

FOREIGN PATENT DOCUMENTS

| | | | |
|---|---|---|---|
| ES | 2 137 856 | A1 | 12/1999 |
| ES | 2 187 314 | A1 | 6/2003 |
| ES | 2 303 829 | T3 | 9/2008 |
| ES | 2 314 514 | T3 | 3/2009 |
| ES | 1 075 682 | U | 11/2011 |
| WO | 02/055334 | A1 | 7/2002 |

OTHER PUBLICATIONS

European Search Report for PCT/ES2019/070187 dated Jul. 10, 2018.

Written Opinion for PCT/ES2019/070187 dated Jul. 4, 2019 [PCT/ISA/237].

* cited by examiner

RETRACTABLE RAMP ASSEMBLY FOR ALLOWING PEOPLE TO ENTER VEHICLES

CROSS REFERENCE TO RELATED APPLICATIONS

This application is a National Stage of International Application No. PCT/ES2019/070187 filed Mar. 20, 2019, claiming priority based on European Patent Application No. 18382192.5 filed Mar. 21, 2018.

TECHNICAL FIELD OF THE INVENTION

The present invention relates to a retractable ramp assembly for access to vehicles, particularly to public transport and private vehicles, suitable to be mounted on the floor of a door of the vehicle and capable of adopting two end positions, a first resting position, wherein the ramp is folded in the vehicle, and a second operative position, wherein it is extended on an inclined plane from the floor of the vehicle to the surface of the ground on which the latter is located.

BACKGROUND OF THE INVENTION

Today, the majority of public transport vehicles, such as trams, trains and buses, are equipped with automatic concealable or retractable ramps to facilitate access to said vehicles for people in wheelchairs, with reduced mobility, people pushing baby pushchairs, shopping carts, etc. Examples of these types of ramps are those described in the patent document ES2187314 and in the utility model document ES1075682.

In general, ramp assemblies are formed by a structure or framework that is fixedly mounted to the vehicle, or in the lower portion thereof or integrated into the floor of the vehicle, in an area adjacent to a passenger entry and exit door. A platform is provided inside the framework that, when activated by the conductor or by other position control means of the vehicle, is pushed by movement transmission means from the rear portion of the framework until it emerges horizontally through the front portion, the front portion being the one which is oriented towards the exterior where there are passengers, and it is inclined until the front portion of the platform rests on the surface on which the passengers are waiting. In order to move the platform with respect to the framework, the platform and the framework are provided with bearings and guide channels. As such, the platform can change from an end resting position, wherein it is confined inside the framework, without protruding from the vehicle, to an operative ramp position, wherein it is arranged inclined outside the framework between the passenger waiting surface and the floor of the vehicle.

A common situation in which the use of a concealable or retractable ramp is essential arises in train and tram stations, wherein there is a significant separating space in the horizontal direction and especially in the vertical direction between the surface on which the people wishing to access the vehicle are located, for example, a station platform, and the floor of the vehicle. The ramp bridges this separating distance so that passengers can walk up the ramp in order to access the vehicle and walk down the same in order to disembark.

One problem that some ramps of this type have is that in the operative ramp position, the highest rear side of the platform is not at the level of the floor of the vehicle, but rather there is a height difference, which although may seem small, is not negligible when it regards facilitating normal access of wheelchairs, pushchairs or people who have difficulty walking, since going up this height difference entails greater effort and can even result in a hindrance to accessing the vehicle and cause tripping and falls.

Patent document ES2137856 proposes to solve this problem by including means that enable the rear portion of the platform to be automatically raised to the level of the inner floor of the vehicle, in a phase immediately after the extraction of the platform outside the resting position thereof, and the leveling of the front portion thereof with respect to the ground (or to the surface where passengers that wish to board the vehicle are waiting). Said document describes how the structure or framework secured to the chassis of the vehicle comprises therein a mobile frame linearly linked to the platform, which moves in the movements thereof towards the exterior in order to place the front portion thereof at ground level. The frame has a motorised shaft, which extends horizontally and parallel to the front side of the aforementioned frame, and said shaft entails rods, which are integral and transverse to the same, that are joined by the opposite ends thereof to a second shaft, which is parallel to the above shaft, that in turn extends along the rear side of the platform, to which it belongs, this second shaft being an idler shaft. The motorised shaft carries out an axial rotation of 90°, which enables the horizontal rods to be placed in a vertical position in order to raise the rear portion of the platform, to the level of the inner floor of the vehicle, in combination with the idler shaft of the platform. Furthermore, it mentions that the rods can be adjusted in length to adapt the dimension thereof to the gap to be bridged between the shaft and the level of the inner floor of the vehicle, although details are not provided as to how the length is adjusted. For the insertion or folding of the platform in the structure of framework, where it is retracted, the movements of the bodies described is reversed, the assembly returning to its inner resting position. As is to be expected, in this case the rods, which are short in length, are subjected to high stress.

Another patent document that proposes to solve the same problem is ES2314514-T3, wherein it describes a deployable access ramp for local and long distance public transport vehicles with a platform, which in the retracted state is disposed in a housing which is disposed below the vehicle floor in the area behind a step of the threshold plate, wherein the actuating and guide means for the platform are arranged, and which can be deployed from the housing moving to a position of use for which the rear end of the platform is articulated via first guide levers articulately joined to the platform in a transport element guided in the housing, movable with the actuating means in the direction of deployment. The first guide levers can be folded up to a final position in the last phase of the movement of deployment starting from an extended position extending substantially in the direction of deployment, wherein it forms a neutral position with the transport element, such that the rear end of the platform rises and is immobilised in the folded up position. At the rear end of the platform they are articulated with an end guide elements, and which other end of the guide elements is connected respectively to the transport element by an articulation, which is displaceably guided in an oblong hole extending in the transport element in the direction of deployment. The oblong hole is sized such that in the extended position of the first guide lever the articulation is located at the front end of the oblong hole, and in the final folded up position the articulation is located at the rear end of the oblong slot. In the path of the corresponding guide element in the area of the last phase of the movement of deployment, an inclined surface is disposed in the housing, which abuts against the guide element and raises to allow the unlocking of the neutral position between the first guide lever and the transport element and to initiate the folding up of the first guide lever. The guide element has, on the lower face at the front end, an inclined surface oriented upwards, which abuts against the inclined surface of the housing.

Patent document ES2303829-T3 also proposes an alternative solution in order to raise the rear end of the platform. This document describes a foldaway ramp comprising a supporting structure fitted in a housing under the floor of the vehicle, a platform that can be moved between a retracted position and an extracted position with respect to said supporting structure, parallel to the floor of the vehicle, electric actuator control elements to perform the movements of said platform between the retracted and extracted positions, and cam-type elements to actuate the slant of said platform, during the final phase of the displacement towards the extracted position, from a position parallel to said floor to a position which is slanted downwards, wherein the front edge of the platform rests on the ground, and the return to said retracted position, by effect respectively of raising and lowering the rear side of said platform operated by said cam elements. Said cam elements include slippery surfaces with an upward slant located close to the front edge of said support structure and have a curved profile; and elements with a shape complementary to that of said sliding surfaces articulated at the rear edge of said platform and that work together by means of friction contact with said sliding surfaces. Said sliding surfaces and said complementary elements are located at the height of the ends of the front side of the support structure and the rear side of said platform, respectively. In addition, the cam elements also include mutual stop portions that can be removed from the platform in the downward slanted position. These mutual stop portions that can be removed include cavities located close to the front edge of the support structure, in front of said sliding surfaces, and stop protrusions adjacent to said complementarily shaped elements and that fit in said cavities. The complementarily shaped elements are at the ends of an articulated profile element at the rear edge of the platform.

It would be desirable to have an alternative ramp assembly that enables the vertical separation between the floor of the vehicle and the rear side of the platform to be minimised when it is in the operative position, unfolded and inclined on the ground where there are passengers who wish to access the vehicle, which does not entail major changes to the current ramps and the integrity of the elements that withstand the operation of minimising the gap, including the articulations, are not compromised due to the stresses to which they are subjected during the movement in which the rear side of the platform is raised.

DESCRIPTION OF THE INVENTION

For the purpose of providing an alternative solution, a retractable ramp assembly for people to access vehicles, particularly to public transport vehicles, suitable to be mounted integrated in the floor of the vehicle and flush at the top with the same in an area adjacent to a door of the vehicle and capable of adopting two end positions is disclosed: a resting position, wherein an access platform, which is essentially rectangular and that forms part of the ramp assembly, is hidden inside the vehicle, and an operative ramp position, wherein the platform is arranged on an inclined plane from the floor of the vehicle to a surface located at a lower height level from which people access the vehicle. The ramp assembly object of the invention comprises:

- a framework, capable of being fixedly mounted and integrated in the area of the floor of the vehicle adjacent to a door and suitable for housing and moving the platform therein, the framework being provided with an oblong front opening, which extends parallel to the rear side of the platform, for the platform to pass through it from one end position to the other;
- movement transmission means linked to the rear side of the platform, through which the platform moves linearly along the framework, moving closer to and further from the front opening; and
- a lifting mechanism to minimise the height difference between the floor of the vehicle and the rear side of the platform in the operative ramp end position.

Essentially, the ramp assembly of the invention is characterised in that the framework comprises a base that supports at least one lower bearing for the movement and lower support of the platform while the platform moves inside and with respect to the framework, the at least one lower bearing being located in the vicinity of the front opening and with the rotation shaft thereof oriented according to a direction parallel to the rear side of the platform, and in that the lifting mechanism comprises:

- at least one rocker piece arranged between the movement transmission means and the platform to which the rocker piece is joined by means of respective first and second articulations, the rotation shafts of these articulations being parallel to the rear side of the platform, the rocker piece being located above the base of the framework and the rocker piece having a lower face oriented towards the base of the framework; and
- at least one wedge, the base of which is fixedly arranged on the lower face of the at least one rocker piece, such that the inclined surface of the wedge is arranged facing towards the at least one lower bearing provided in the base of the framework, such that when the platform has passed through the front opening, the rear side thereof being outside the framework, the platform adopts a lifting position, before the operative ramp position, wherein the rocker piece moves with respect to the framework, a portion of the inclined surface of the at least one wedge resting directly on the at least one lower bearing, causing the rear side of the platform to raise to the level of the floor of the vehicle.

According to another characteristic of the invention, the wedge is fixedly joined to the rocker piece in a section located between the articulations thereof, and wherein the inclined wedge surface intended to come into contact with the lower bearing forms an inclined plane with an angle comprised between 30° and 50°, preferably 40°, and wherein the base of the inclined plane is oriented parallel to the floor of the vehicle when the platform is or moves from the end resting position to any position before a lifting position.

In accordance with another characteristic of the invention, the wedge comprises an additional inclined surface adjacent to the inclined wedge surface with which it forms an obtuse angle, preferably between 115° and 135°, and that is parallel to the surface of the upper face of the rocker piece, the additional inclined surface constituting the surface on which the rocker piece rests on the lower bearing when the ramp adopts the operative ramp position, a position in which the additional inclined surface is arranged parallel to the floor of the vehicle. As such, in the operative ramp position, the additional inclined surface is arranged horizontally (parallel to the floor of the vehicle, considering that it circulates on flat ground), and therefore, the stresses created by the raising of the rear side of the platform to the level of the floor of the vehicle are transferred to the base of the frame.

According to another characteristic of the invention, the movement transmission means comprise a sliding unit to which the at least one rocker piece is articulately joined, said sliding unit being configured as a guided plate and longitudinally movable along the framework on a plane parallel to the floor of the vehicle and to the base of the framework.

According to another characteristic of the invention, the framework comprises an essentially flat front frame that is arranged according to a plane perpendicular to that of the floor of the vehicle, which configures the oblong front opening configured for the platform to pass through it when moving from one end position to the other; an essentially flat and rectangular-shaped upper cover, which is intended to be flush with the bottom of the floor of the vehicle and with dimensions such that the movement transmission means and the platform are hidden under the upper cover when the platform is in the resting position; and an oblong threshold piece, which is arranged adjacent to the upper cover, contained in a plane perpendicular to that of the front frame and arranged joined or coupled to said frame, with dimensions such that the at least one rocker piece is hidden under the threshold piece when the platform is in the operative ramp position and in the lifting position.

According to another characteristic of the invention, the upper cover is configured by way of a hatch for the inspection of the components of the ramp assembly arranged below the same and to provide access for the maintenance thereof.

In accordance with a preferred embodiment of the invention, the ramp assembly comprises a single rocker piece provided with several wedges that are separated from each other and at least as many lower bearings as there are wedges.

Alternatively, the ramp assembly can comprise several rocker pieces with at least one wedge in each of the rocker pieces, and at least as many lower bearings as there are wedges. Furthermore, according to another variant, the ramp assembly can comprise a single rocker piece provided with a single wedge, and several lower bearings, in which case the wedge has a continuous configuration that extends in the transverse direction of the platform and covers the distance between the two lower bearings located at the ends, such that all the lower bearings come into contact with the inclined wedge surface and with the additional inclined surface adjacent to the same.

According to another characteristic of the invention, the ramp assembly comprises lateral protective barriers coupled to the lateral sides of the platform, formed by rectangular flat portions configured as levers wherein the fulcrums thereof correspond to rotation shafts arranged along the lateral sides of the platform, wherein the lateral protective barriers are capable of moving from a non-protective position, in which the lateral protective barriers are folded down on the platform, to a protective position, in which the lateral protective barriers are oriented according to a plane essentially perpendicular to the platform, when the corresponding outermost lever arms of the platform are pressed with a foot.

According to another characteristic of the invention, the framework comprises lateral guides arranged in collaboration with lateral channels, which have a profile comprising a curved or inclined section, located between a straight front section and a straight rear section that is longer and wider than the straight front section, such that the curved or inclined section joins a guide contact surface that extends from a rear lower height to a front upper height close to the front opening of the framework. These lateral guides help the front side of the platform incline upwards when it is close to passing through the oblong front opening of the framework in order to adopt the operative ramp position.

In accordance with another characteristic of the invention, the framework is provided with an assembly of lateral channels for the coupling of the lateral sides of the platform through respective lateral bearings, and at least one base that supports at least one lower bearing for the movement and lower support of the platform while the platform moves inside and with respect to the framework.

BRIEF DESCRIPTION OF THE DRAWINGS

The accompanying drawings illustrate by way of non-limiting example, a preferred embodiment of the ramp assembly object of the invention. In said drawings.

DETAILED DESCRIPTION OF THE DRAWINGS

Figure 1:
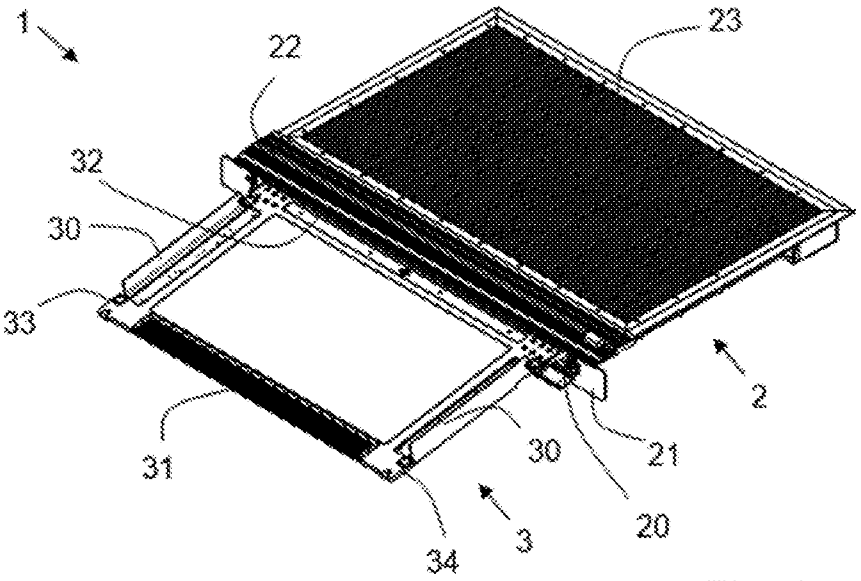
FIG. 1 is a perspective view of the ramp assembly object of the invention, in the operative ramp position.

FIG. 1 shows the retractable ramp assembly 1 object of the invention, suitable for people to access vehicles, particularly to public transport and also private vehicles. The ramp assembly 1 is mounted integrated in the floor of the vehicle and flush at the top with the same in an area adjacent to a door of the vehicle and capable of adopting two end positions:

- a resting position, not shown in the figures, wherein an access platform 3, which is essentially rectangular and that forms part of the ramp assembly 1, is hidden inside the vehicle, and
- an operative ramp position, shown in FIGS. 1 to 4, wherein the platform 3 is arranged on an inclined plane from the floor of the vehicle to a surface located at a lower height level from which people access the vehicle.

The ramp assembly comprises an access platform 3 for people to access the vehicle, a framework 2 or support structure, movement transmission means and a lifting mechanism. These components are described in detail below.

The access platform 3 for people to access the vehicle is rectangular shaped, which means that a front side 31, which is that which rests on the surface on which the people wishing to access the vehicle are located, a rear side 32, which is the closest to the floor of the vehicle in the operative ramp position, and two lateral sides 33 and 34, can be identified. The lower face of the platform 3, which is opposite the surface that can be walked on by the passengers, preferably comprises a series of longitudinal protrusions or ribs 35 that define a contour formed by a flat surface flanked by two end sections with opposite inclinations. The ribs 35 are aligned with lower bearings 6 provided in the framework 2, such that when the platform 3 exits through the front opening 20, the contact of the ribs 35 with the lower bearings 6 means that the front portion of the platform 3 is raised slightly and that when it is practically outside, it is inclined downwards until it rests on the ground. The platform 3 is movable with respect to the framework 2 that is described below.

Figure 17:
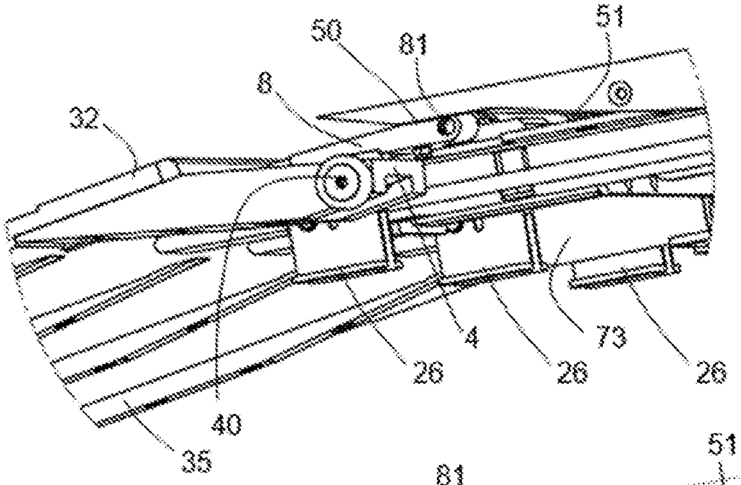
FIGS. 17 to 20 are perspective views, respectively, of the lifting mechanism and other components of the ramp assembly shown in FIGS. 13 to 16.
Figure 18:
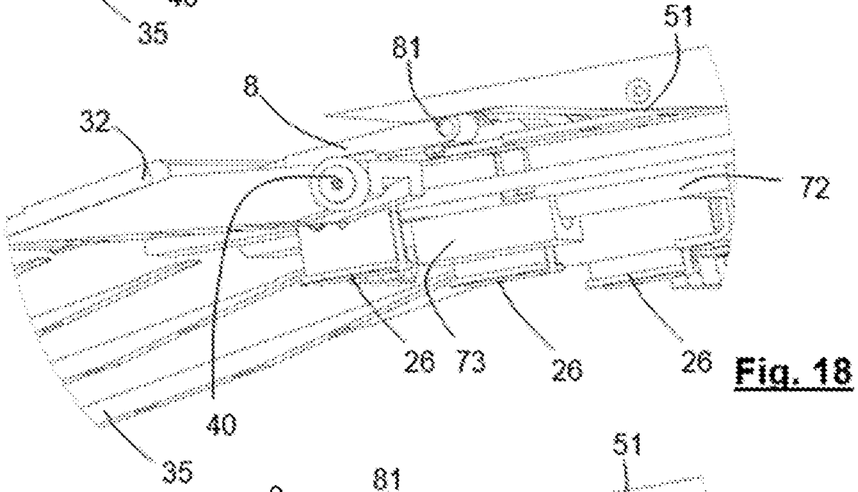
Figure 19:
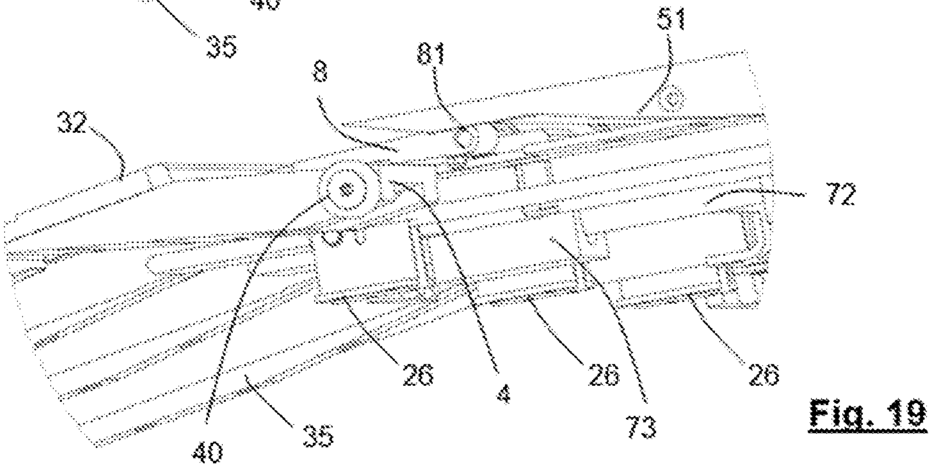
Figure 20:
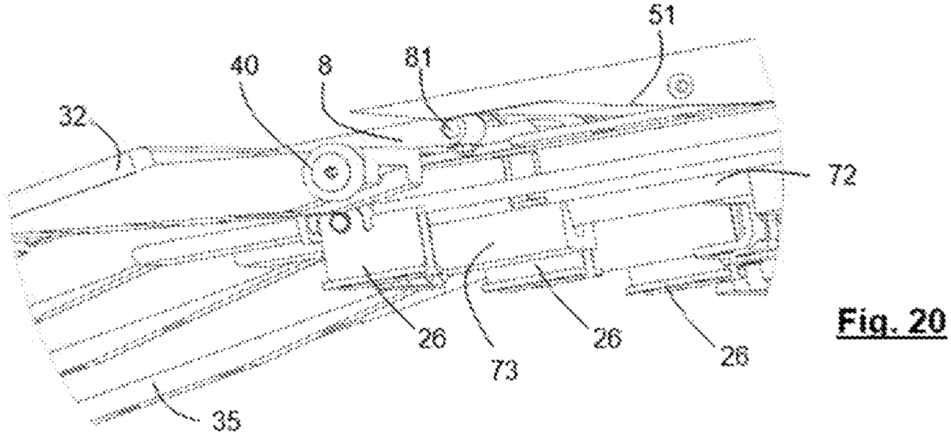

The framework 2 is capable of being fixedly mounted, integrated in the floor of the vehicle and flush at the top with the same in an area adjacent to a door of the vehicle, and the dimensions are suitable for housing the platform 3 therein. The framework 2 is provided with an oblong front opening 20, which extends in a direction parallel to the rear side 32 of the platform, for the platform 3 to pass through it from one end position to the other, with an assembly of lateral channels 4 (see FIGS. 17 to 19) for coupling the lateral sides 33 and 34 of the platform 3 though respective lateral bearings 40, and with at least one base 26 that supports at least one lower bearing 6 of a rotation shaft parallel to the rear side 32 of the platform 3, for the movement and lower support of the platform 3 while the platform 3 moves inside and with respect to the framework 2. The framework 2 is preferably formed by four profiles that make up a frame on the horizontal plane, with sides essentially parallel to those of the platform 3, which serve to couple the rest of the components of the framework, such as for example, to fasten the lateral channels 4 and place the lateral guides 5 in the lateral profiles. The front profile, which serves as a support for the front opening 20, can serve as an element to fasten thereto the base 26 or bases 26 distributed along the front profile, depending on the dimensions and scale of the platform 3.

The movement transmission means are linked to the rear side 32 of the platform 3, which move linearly along the framework 2 moving closer to and further from the front opening 20. The movement transmission means can be seen in FIGS. 2 to 4, and comprise a sliding unit 71 configured as a plate that is linearly movable along the framework 2 on a plane parallel to the floor of the vehicle and to the base 26 of the framework 2. The power that makes the platform 3 move is generated by a direct current motor (no shown) that includes a brake and an encoder. By means of an angular gearbox, a spindle nut mounted on a spindle receives the generated movement in order to transmit it to the platform 3. The spindle nut is fastened to the sliding unit 71, and the sliding unit 71 is in turn articulately joined to a rocker piece 8 (which shall be explained later), enabling the extraction and storage of the platform 3. Neither the spindle nor the nut thereof have been shown in the figures, but FIG. 2 shows, by means of a dashed line 74, the axial direction of the spindle, which is arranged parallel and between two chrome linear guide bars 72, which form part of a secondary transmission system.

Figure 2:
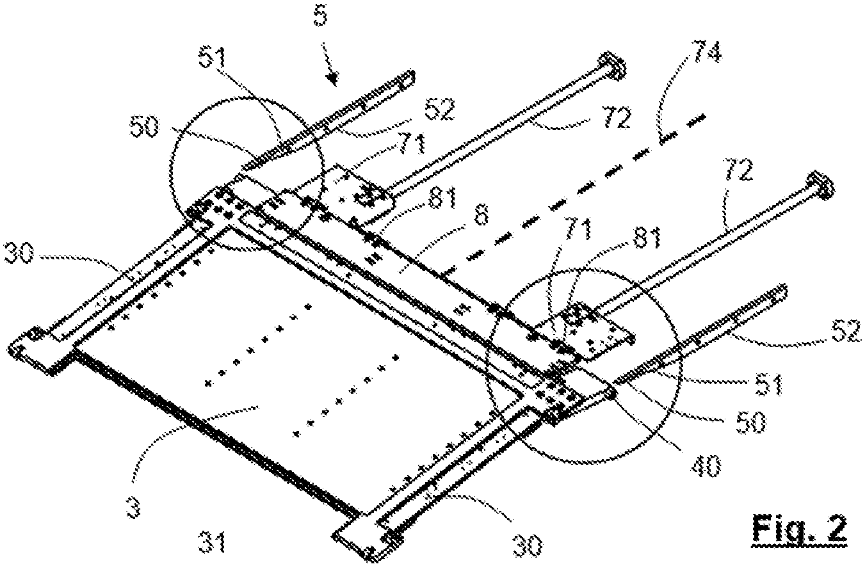
FIGS. 2, 3 and 4 are perspective views of the access platform and some other components of the ramp assembly that are hidden in FIG. 1 by some parts of the framework such as the upper cover.
Figure 3:
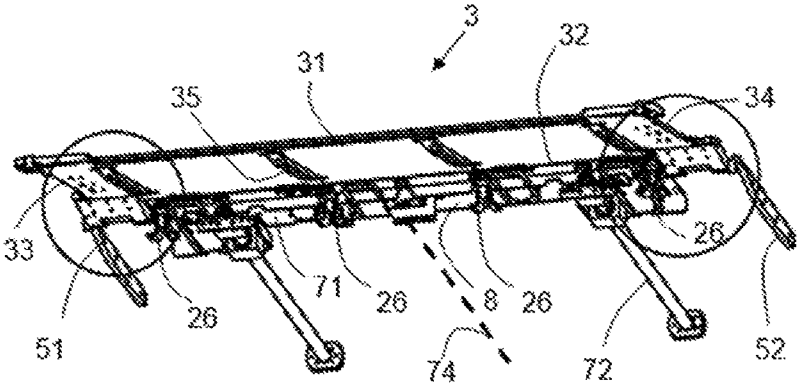
Figure 4:
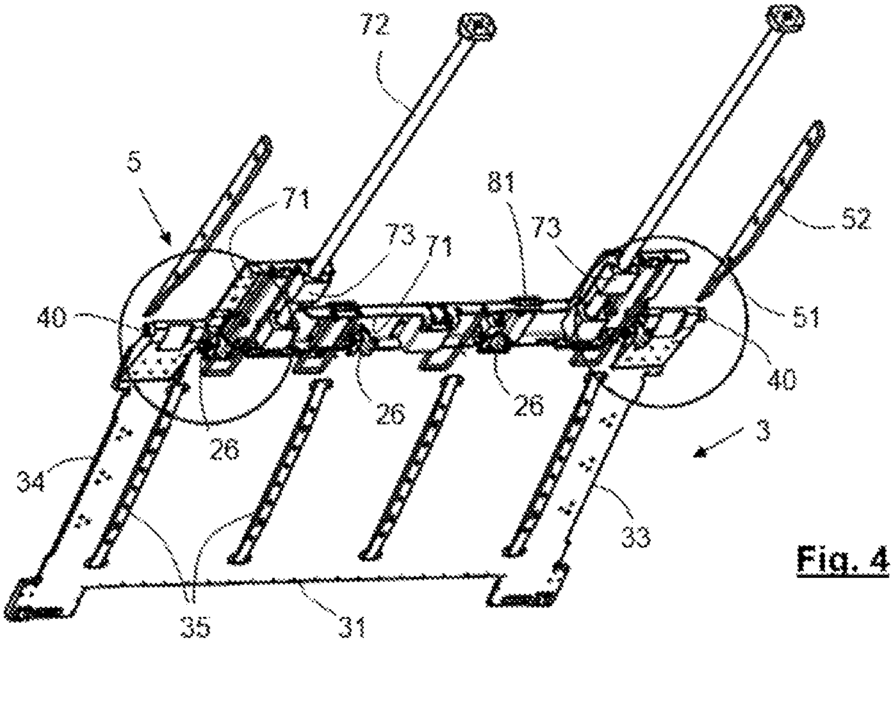

FIGS. 2 to 4 show that the two linear guide bars 72 oriented in the longitudinal direction of the platform 3 support corresponding ball bushings 73 that contribute to the sliding movement and transmit the stresses of the mobile portions of the ramp assembly to the static portions. The ball bushings 73 are coupled to the sliding unit 71 for the guiding thereof, and the movement of the sliding unit 71 causes the push and pull of the platform 3 (with the interposition of rocker pieces 8 that shall be explained later).

The function of the lifting mechanism is to minimise the height difference between the floor of the vehicle and the rear side 32 of the platform 3 in the operative ramp end position.

The lifting mechanism, especially shown in FIGS. 5 to 8 and 21, comprises:

- at least one rocker piece 8 arranged between the movement transmission means (sliding unit 71) and the platform 3 to which the rocker piece 8 is joined by means of respective first and second articulations 81, 82, the rotation shafts of these articulations being parallel to the longest side of the oblong front opening 20 of the framework 2. The rocker piece 8 is located above the base 26 of the framework 2 and has a lower face oriented towards the base 26 of the framework 2. In FIGS. 13 to 16 it may be seen that the lower face of the platform 3 has recesses 36 in the rear margin thereof to couple and screw an end tab of the rocker piece 8 close to the second articulation 82; and
- at least one wedge 9, the base of which is fixedly arranged on the lower face of the rocker piece 8, such that the inclined surface 91 of the wedge 9 is arranged facing towards the at least one lower bearing 6 provided in the base 26 of the framework 2, such that when the platform 3 has passed through the front opening 20, the rear side 32 thereof being outside the framework 2 (FIGS. 5, 9, 13 and 17), the platform 3 adopts a lifting position, (FIGS. 6, 7, 10, 11, 14, 15, 18 and 19), before the operative ramp position (FIGS. 8, 12, 16 and 20), wherein the rocker piece 8 moves with respect to the framework 2, a portion of the inclined surface 91 of the at least one wedge 9 resting directly on the at least one lower bearing 6, causing the rear side 32 of the platform 3 to raise to the level of the floor of the vehicle.

The wedge 9 is fixedly joined to the rocker piece 8 in a section located between the articulations 81, 82 thereof, in a fitting made in the lower face of the rocker. The inclined wedge surface 91 intended to come into contact with the lower bearing 6 forms an inclined plane with an angle comprised between 30° and 50°, preferably 40°, wherein the base of the inclined plane is oriented parallel to the floor of the vehicle when the platform 3 is or moves from the end resting position to any position before a lifting position.

Figure 21:
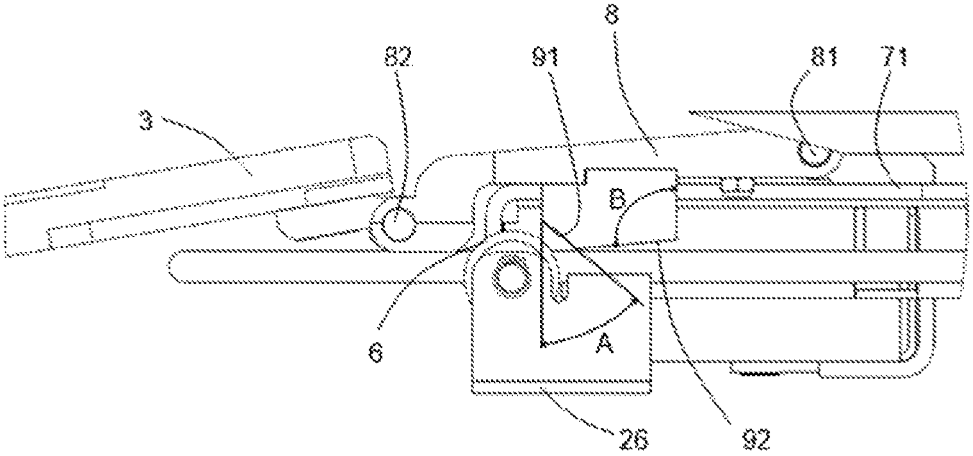
FIG. 21 is a detailed view of the lifting mechanism of FIG. 5.

As shown in detail in FIG. 21, the wedge 9 comprises an additional inclined surface 92 adjacent to the inclined wedge surface 91 with which it forms an obtuse angle, preferably between 115° and 135°, constituting the surface on which the rocker piece 8 rests when the ramp adopts the operative ramp position (FIGS. 8, 12, 16 and 20). In FIG. 21, the angles A and B shown in the preferred embodiment of the wedge 9 have been delimited, wherein A is an angle of approximately 50° and B is 95°.

Figure 5:
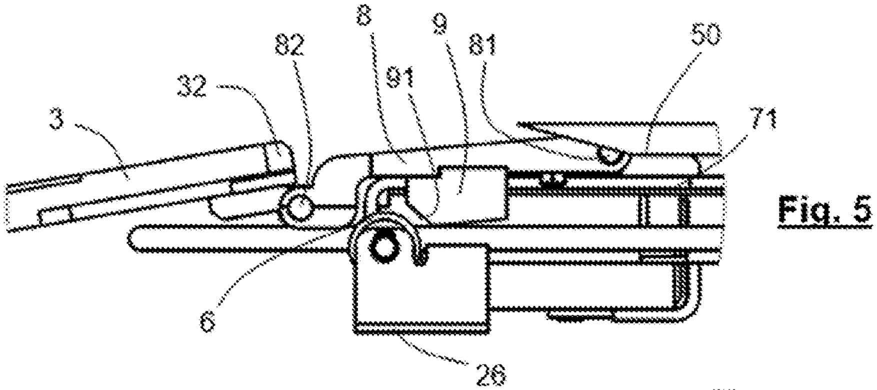
FIGS. 5 to 8 are detailed side views of the lifting mechanism and other components of the ramp assembly of FIG. 1 in different positions, from a position before the lifting position (FIG. 5), during the lifting position (FIGS. 6 and 7), and to the operative ramp position (FIG. 8)
Figure 6:
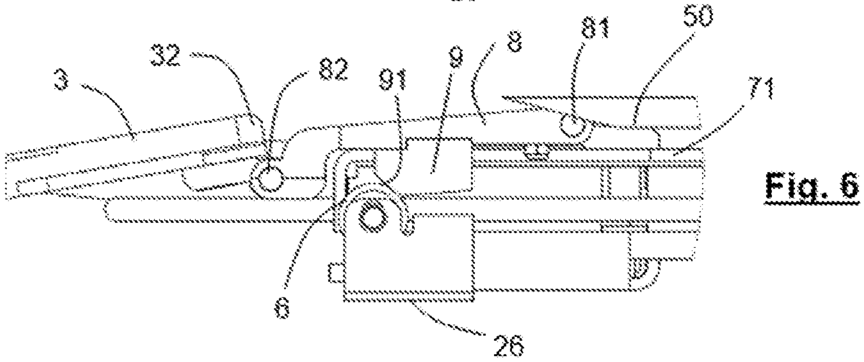
Figure 7:
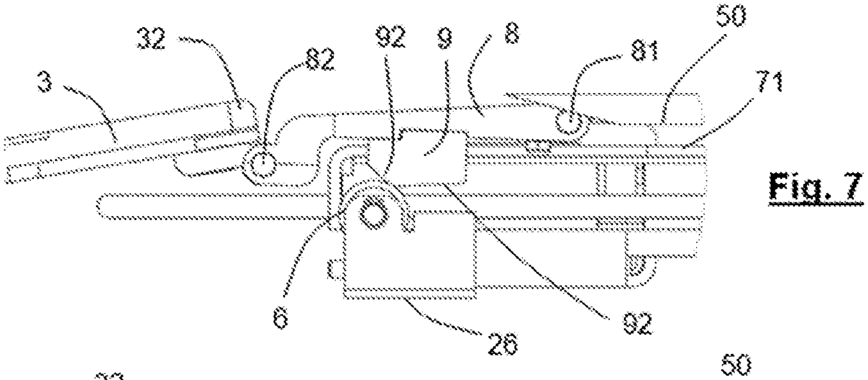
Figure 8:
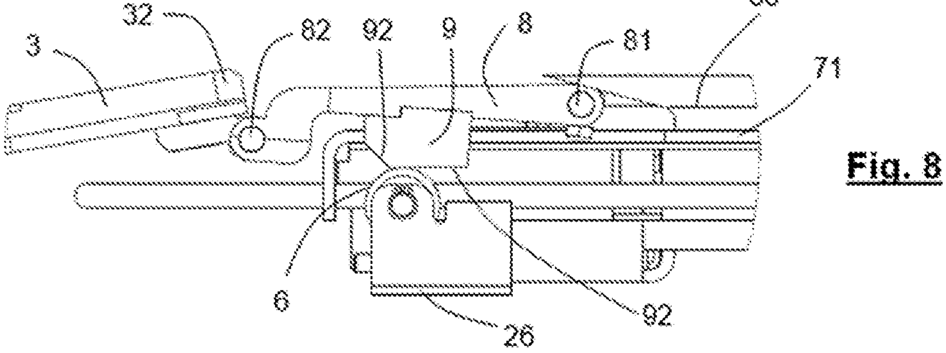
Figure 9:
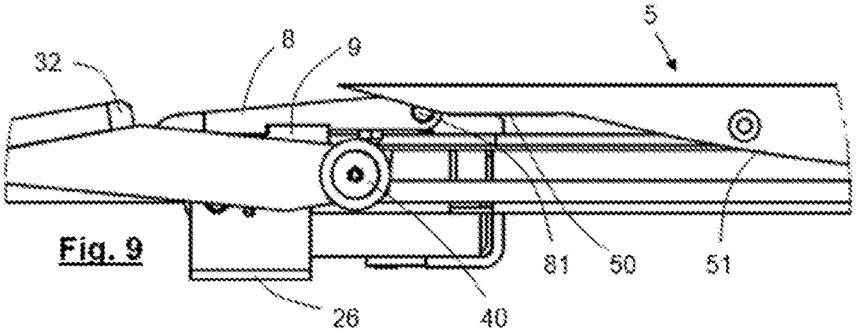
FIGS. 9 to 12 are side views of the same positions as those of FIGS. 5 to 8 but seen from the side in which the lateral bearing is located.
Figure 10:
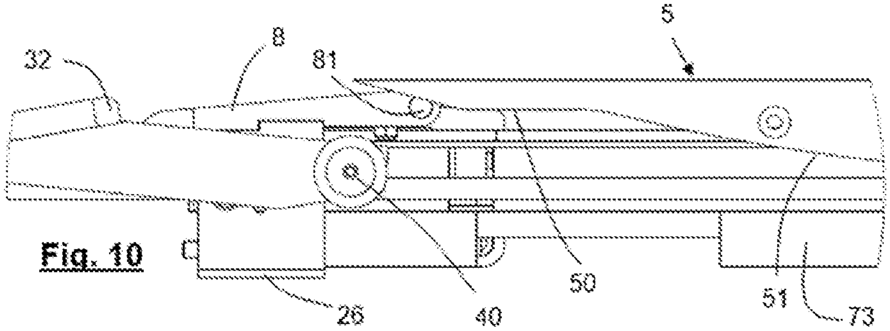
Figure 11:
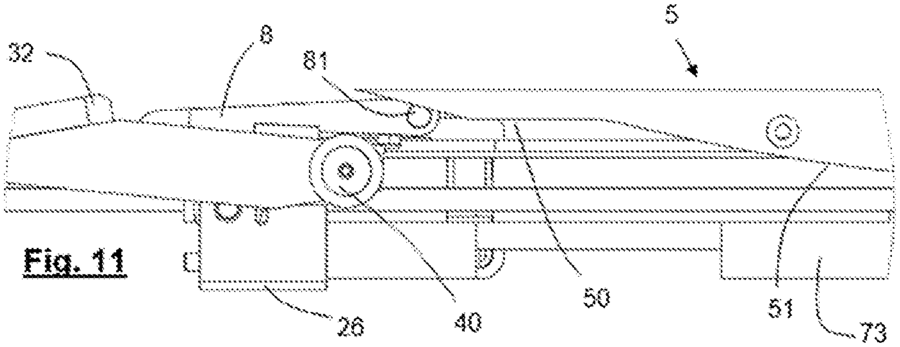
Figure 12:
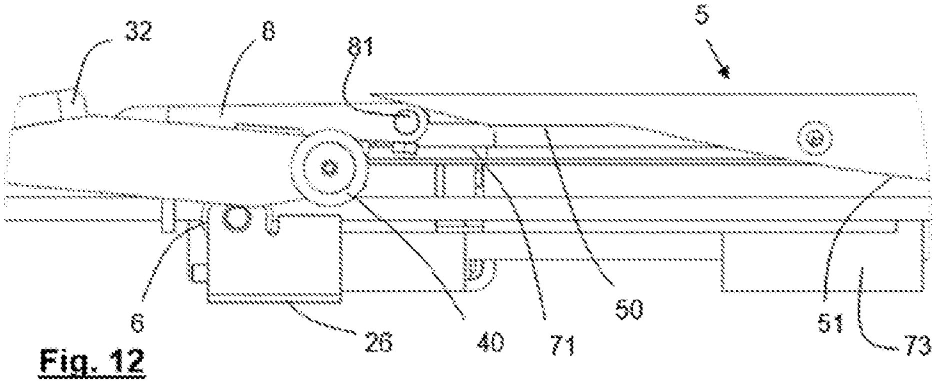
Figure 13:
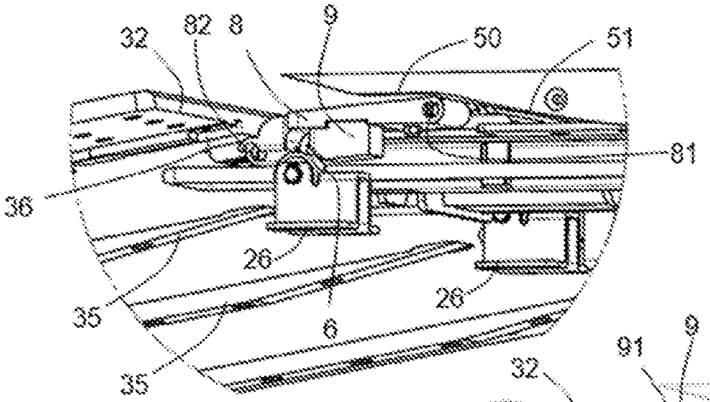
FIGS. 13 to 16 are perspective views, respectively, of the lifting mechanism and other components of the ramp assembly represented in FIGS. 5 to 8, with the platform shown disassembled from the rocker piece in order to better see where the articulated join between the same occurs.
Figure 14:
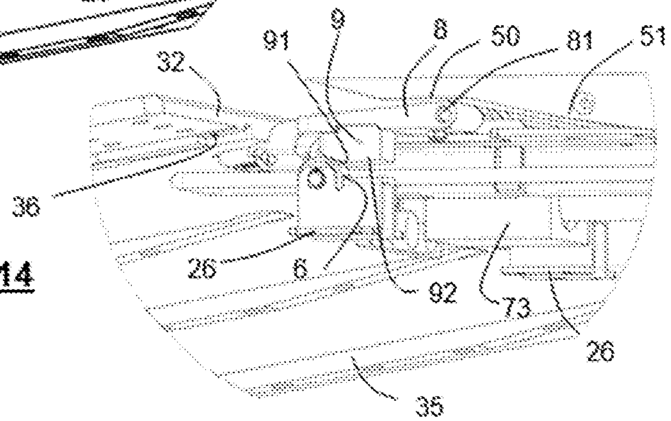
Figure 15:
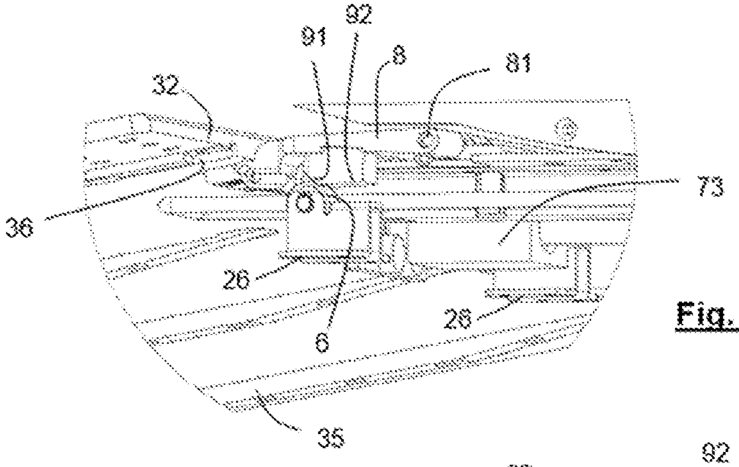
Figure 16:
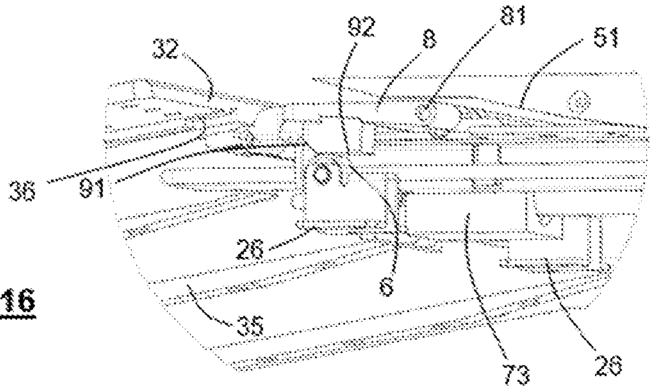

As such, the inclined surface 91 of the wedge 9 shown in the figures shows an increasing inclination in the direction of approach of the wedge 9 to the lower bearing 6 when starting from the resting position and the platform moves to adopt the operative ramp position, in other words, when the platform 3 is emerging to the exterior of the framework 2, going from right to left in FIG. 5. By contrast, the additional inclined surface 92 has a decreasing incline if the right-to-left direction is considered in FIG. 5.

Considering the sequence of the movement of the platform 3 in FIGS. 5 to 8, FIG. 5 corresponds to a moment when the rear side 32 of the platform 3 has emerged outside of the front opening 20 to adopt the operative ramp position. In FIG. 5 the lifting of the rear side 32 has not yet started, but the movement transmission means 71 are pushing the platform 3 outwards (towards the left) when the rocker piece 8 that is articulated to the sliding unit 71 and to the platform 3 is pushed. The push is such that in FIG. 6 the rocker piece 8 has moved towards the left and the wedge 9 provided on the lower face thereof initiates the contact with the rolling surface of the lower bearing 6. Then, the rocker piece 8 continues moving and the inclined wedge surface 91 rests on the rolling surface and, therefore, the contact point on the rolling surface is located at an increasingly higher level until it reaches the vertex of the wedge 9 that forms the inclined wedge surface 91 with the additional inclined surface 92 (a moment between the positions shown in FIGS. 7 and 8). As shown in detail in FIG. 8, which corresponds to the operative ramp position, the additional inclined surface 92 is arranged horizontally, that is, parallel to the upper face of the rocker 8 and that in turn is parallel to the surface of the floor of the vehicle. In this operative ramp position, the stress on the lower bearing 6 is vertical, meaning that the stress on a spindle, not shown in the drawings, but located parallel to and between the linear guide bars 72, is zero.

FIG. 21 shows how the additional inclined surface 92 is practically or almost parallel to the surface of the upper face of the rocker piece. This means that when the contact point between the rolling surface of the lower bearing 6 coincides with the vertex of the inclined surfaces 91 and 92 of the wedge 9, the following movement of the platform 3, shown in FIG. 8, helps to stabilise the position of the rear side 32 of the platform, leaving it at practically the same height as the surface of the floor of the vehicle.

In particular, the preferred embodiment of the ramp assembly 1 shown in the figures comprises a rocker piece 8 that extends transversally, in other words, in a direction parallel to the rear side 32 of the platform 3, said rocker piece being provided with several wedges 9 that are separated from each other, four wedges 9 in the drawings, and at least as many lower bearings 6 as there are wedges 9.

Furthermore, as can be seen in FIG. 1, the framework 2 comprises:

a front frame 21 that is essentially flat and arranged according to a plane perpendicular to that of the floor of the vehicle, which configures the oblong front opening 20 configured for the platform 3 to pass through it when moving from one end position to the other, an upper cover 23, which is essentially flat and rectangular-shaped, and intended to be flush with the bottom of the floor of the vehicle and with dimensions such that the movement transmission means and the platform 3 are hidden under the upper cover 23 when the platform 3 is in the resting position. The upper cover 33 is configured by way of a hatch for the inspection of the components of the ramp assembly 1 arranged below the same and to provide access for the maintenance thereof, and an oblong threshold piece 22, which is arranged adjacent to the upper cover 23, contained on a plane perpendicular to that of the front frame 21 and arranged joined or coupled to said frame 21, with dimensions such that the at least one rocker piece 8 is hidden under the threshold piece 22 when the platform 3 is in the operative ramp position and in the lifting position.

lateral guides 5 arranged in collaboration with lateral channels 4, which have a profile comprising a curved or inclined section 51, located between a straight front section 50 and a straight rear section 52 that is longer and wider than the straight front section 50, such that the curved or inclined section 51 joins a guide contact surface that extends from a rear lower height to a front upper height close to the front opening 20 of the framework 2. The lateral bearings 40 of the two end pieces with an inclined surface shown in FIG. 2 extend on the sections of these lateral guides 5.

It is especially advantageous for the ramp assembly 1 to comprise lateral protective barriers 30 coupled to the lateral sides 33, 34 of the platform 3, formed by rectangular flat portions configured as levers wherein the fulcrums thereof correspond to rotation shafts arranged along the lateral sides 33, 34 of the platform 3. The lateral protective barriers 30 are capable of moving from a non-protective position, in which the lateral protective barriers 30 are folded down on the platform 3, to a protective position, in which the lateral protective barriers 30 are oriented according to a plane essentially perpendicular to the platform 3, when the corresponding outermost lever arms of the platform are 3 pressed with a foot. FIG. 1 shows how the lateral margins of the platform 3 comprise recessed areas that provide housing for the lateral protective barriers 30 so that, when they are folded down on the platform, they are flush with the rest of the upper surface of the platform 3. The lateral protective barriers 30 comprise polymeric stops to prevent any damage in the event of an impact with the barrier, for example, if the return of the platform 3 to the inside of the framework 2 is ordered and the lateral protective barriers 30 have been left open (if the person in charge forgets to close them manually or with their foot). In addition, the front side 31 of the platform 3 is equipped, on the edge thereof, with a sacrifice piece, made of a technical polymer material, which is easy to replace.

The invention claimed is:

1. A retractable ramp assembly for people to access vehicles, suitable to be mounted integrated in a floor of a vehicle and flush at a top with the same in an area adjacent to a door of the vehicle and capable of adopting two end positions, a resting position, wherein an access platform, which is essentially rectangular and that forms part of the ramp assembly, is hidden inside the vehicle, and an operative ramp position, wherein the platform is arranged on an inclined plane from the floor of the vehicle to a surface located at a lower height level from which people access the vehicle, comprising:

a framework, capable of being fixedly mounted and integrated in the area of the floor of the vehicle adjacent to a door and suitable for housing and moving the platform therein, the framework being provided with an oblong front opening for the platform to pass through it from one end position to the other;

movement transmission plate linked to the rear side of the platform, through which the platform moves linearly along the framework, moving closer to and further from the front opening; and a lifting mechanism to minimize the height difference between the floor of the vehicle and the rear side of the platform in the operative ramp end position, wherein the frame comprises a base that supports at least one lower bearing for the movement and lower support of the platform while the platform moves inside and with respect to the framework, the at least one lower bearing being located in the vicinity of the front opening and with a rotation shaft thereof oriented according to a direction parallel to the rear side of the platform, and the lifting mechanism comprises:

at least one rocker piece arranged between the movement transmission plate and the platform to which the rocker piece is joined by means of respective first and second articulations, rotation shafts of these articulations being parallel to the rear side of the platform, the rocker piece being located above the base of the framework and the rocker piece having a lower face oriented towards the base of the framework; and at least one wedge, a base of which is fixedly arranged on the lower face of the at least one rocker piece, such that an inclined surface of the wedge is arranged facing towards the at least one lower bearing provided in the base of the framework, such that when the platform has passed through the front opening, the rear side thereof being outside the framework, the platform adopts a lifting position, before the operative ramp position, wherein the rocker piece moves with respect to the framework, a portion of the inclined surface of the at least one wedge resting directly on the at least one lower bearing, causing the rear side of the platform to raise to the level of the floor of the vehicle.

2. The ramp assembly according to claim 1, wherein the wedge is fixedly joined to the rocker piece in a section located between the articulations thereof, and wherein the inclined wedge surface intended to come into contact with the lower bearing forms an inclined plane with an angle comprised between 30° and 50°, and wherein the base of the inclined plane is oriented parallel to the floor of the vehicle when the platform is in or moves from the end resting position to any position before a lifting position.

3. The ramp assembly according to claim 2, wherein the wedge comprises an additional inclined surface adjacent to the inclined wedge surface with which the additional inclined surface forms an obtuse angle, and that is parallel to the surface of the upper face of the rocker piece, the additional inclined surface constituting the surface on which the rocker piece rests on the lower bearing when the ramp adopts the operative ramp position, a position in which the additional inclined surface is arranged parallel to the floor of the vehicle.

4. The ramp assembly according to claim 3, wherein the obtuse angle is between 115° and 135°.

5. The ramp assembly according to claim 2, wherein the inclined plane is formed with an angle of 40°.

6. The ramp assembly according to claim 1, wherein the movement transmission plate comprise a sliding unit to which the at least one rocker piece is articulately joined, said sliding unit being configured as a guided plate and longitudinally movable along the framework on a plane parallel to the floor of the vehicle and to the base of the framework.

7. The ramp assembly according to claim 1, wherein the framework comprises an essentially flat front frame that is arranged according to a plane perpendicular to that of the floor of the vehicle, which configures the oblong front opening configured for the platform to pass through it when moving from one end position to the other, an essentially flat and rectangular-shaped upper cover which is intended to be flush with the bottom of the floor of the vehicle and with dimensions such that the movement transmission plate and the platform are hidden under the rectangular-shaped upper cover when the platform is in the resting position, and an oblong threshold piece, which is arranged adjacent to the rectangular-shaped upper cover, contained on a plane perpendicular to that of the front frame and arranged joined or coupled to said front frame, with dimensions such that the at least one rocker piece is hidden under the threshold piece when the platform is in the operative ramp position and in the lifting position.

8. The ramp assembly according to claim 7, wherein the rectangular-shaped upper cover is configured by way of a hatch for the inspection of the components of the ramp assembly arranged below the hatch.

9. The ramp assembly according to claim 1, comprising lateral protective barriers coupled to lateral sides of the platform, formed by rectangular flat portions configured as levers wherein fulcrums thereof correspond to rotation shafts arranged along the lateral sides of the platform, wherein the lateral protective barriers are capable of moving from a non-protective position, in which the lateral protective barriers are folded down on the platform, to a protective position, in which the lateral protective barriers are oriented according to a plane essentially perpendicular to the platform, when the corresponding outermost lever arms of the platform are pressed with a foot.

10. The ramp assembly according to claim 1, wherein the framework comprises lateral guides arranged in collaboration with lateral channels, which have a profile comprising a curved or inclined section, located between a straight front section and a straight rear section that is longer and wider than the straight front section, such that the curved or inclined section joins a guide contact surface that extends from a rear lower height to a front upper height close to the front opening of the framework.

11. The ramp assembly according to claim 1, wherein the framework is provided with an assembly of lateral channels for the coupling of the lateral sides of the platform through respective lateral bearings, and at least one base that supports at least one lower bearing for the movement and lower support of the platform while the platform moves inside and with respect to the framework.

12. The ramp assembly according to claim 1, comprising a single rocker piece provided with several wedges that are separated from each other and at least as many lower bearings as there are wedges.

13. The ramp assembly according to claim 1, comprising several rocker pieces with at least one wedge in each of the rocker pieces, and at least as many lower bearings as there are wedges.

14. The ramp assembly according to claim 1, comprising a single rocker piece with a single continuous wedge that extends in a direction parallel to the rear side of the platform, and several lower bearings.

* * * * *